US008997229B1

(12) United States Patent
Huang et al.

(10) Patent No.: US 8,997,229 B1
(45) Date of Patent: Mar. 31, 2015

(54) ANOMALY DETECTION FOR ONLINE ENDORSEMENT EVENT

(71) Applicant: Google Inc., Mountain View, CA (US)

(72) Inventors: Katherine Huang, San Jose, CA (US); Nandini Kappiah, Los Gatos, CA (US); Xavier Llora, Mountain View, CA (US); Andrew Sellergren, San Francisco, CA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/654,455

(22) Filed: Oct. 18, 2012

Related U.S. Application Data

(60) Provisional application No. 61/605,129, filed on Feb. 29, 2012.

(51) Int. Cl.
*G06F 11/00* (2006.01)
*G06F 21/55* (2013.01)
(52) U.S. Cl.
CPC .................................. *G06F 21/554* (2013.01)
USPC ................... 726/23; 726/22; 726/24; 726/25; 709/223; 709/224
(58) Field of Classification Search
CPC ... H04W 12/12; H04L 63/14; H04L 41/0233; H04L 41/0253; H04L 41/026; G06F 21/60; G06F 17/30386; G06F 21/105; G06F 21/6272; G06F 17/30; G06F 17/30873
USPC ........ 726/22–25; 729/223–224; 709/223–224
See application file for complete search history.

(56) References Cited

U.S. PATENT DOCUMENTS 8,271,878 B2 *  9/2012  Kane et al. .................... 715/733
2006/0047807 A1 *  3/2006  Magnaghi et al. ............ 709/224

* cited by examiner

*Primary Examiner* — Thanhnga B Truong
(74) *Attorney, Agent, or Firm* — Patent Law Works LLP

(57) ABSTRACT

A system for protecting endorsement events against anomalous behaviors is disclosed. The system includes a data collecting module, an activity recording module, an aggregation module, a detection module and an action module. The data collecting module collects event data describing one or more endorsement events. The activity recording module records activity data associated with the one or more endorsement events. The aggregation module aggregates the activity data. The detection module detects, based at least in part on the aggregation of the activity data, one or more anomalies associated with the one or more endorsement events. The action module takes one or more protection actions responsive to the detection of the one or more anomalies. The present disclosure also includes a method for protecting endorsement events against anomalous behaviors.

21 Claims, 11 Drawing Sheets

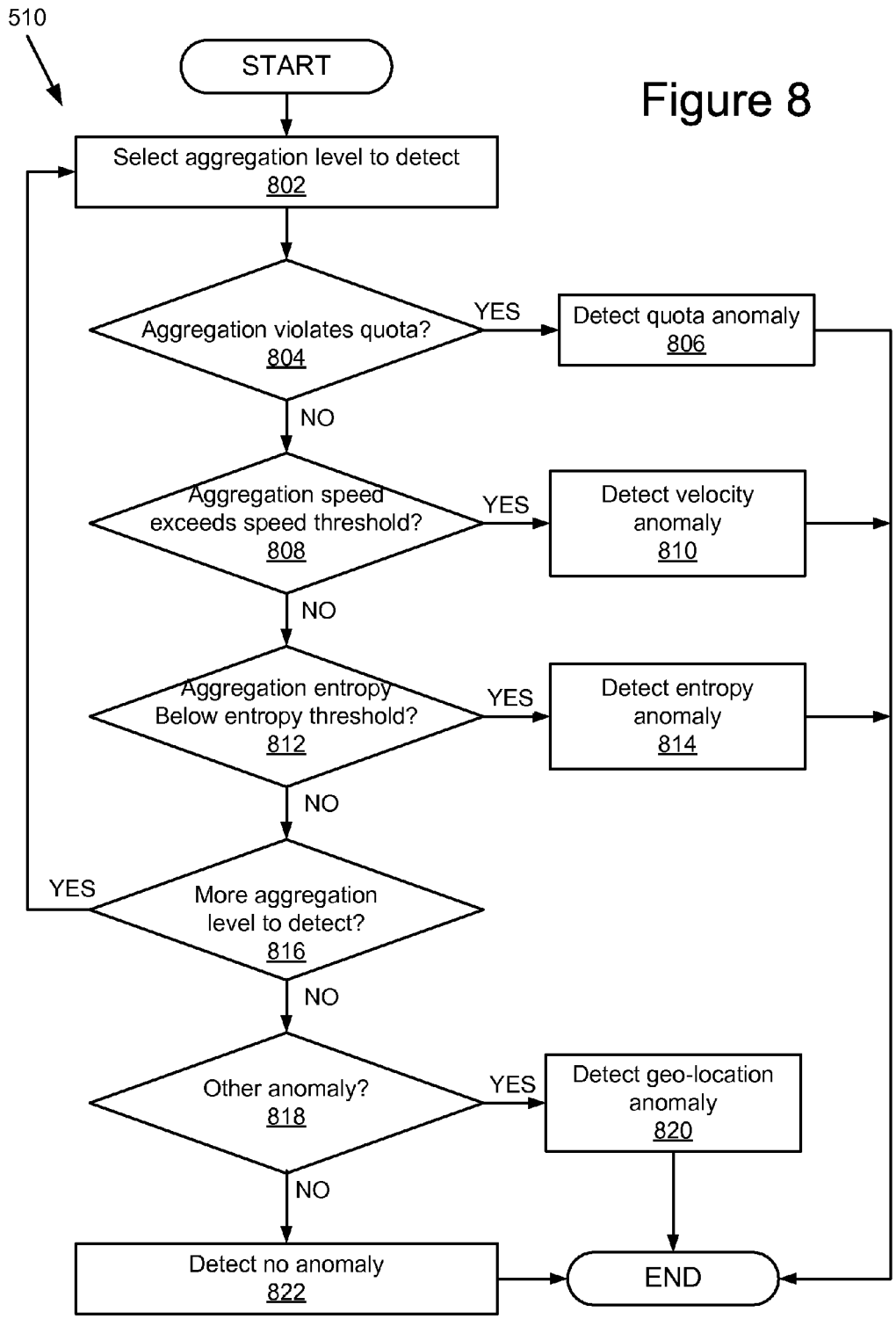

ANOMALY DETECTION FOR ONLINE ENDORSEMENT EVENT

CROSS REFERENCE TO RELATED APPLICATIONS

This application claims priority under 35 USC §119(e) to U.S. Application No. 61/605,129, entitled "Anomaly Detection For Online Endorsement Event" filed Feb. 29, 2012, the entirety of which is herein incorporated by reference.

BACKGROUND

The present disclosure relates to processing online endorsement events. In particular, the present disclosure relates to systems and methods for protecting online endorsement events against any anomalous behavior.

The popularity of using online endorsements to approve various products and/or services has grown dramatically in recent years. For example, possible endorsements include but are not limited to a user rating a review, recommending a book or endorsing an—item such as a web page, a product, a service, an advertisement, a post, a comment, a video, etc. However, these online endorsement events are vulnerable to various malicious attacks such as clickjacking and/or abuse of the endorsement events. For example, spammers and/or abusers may attempt to trick users to endorse low quality products using clickjacking techniques such that if a user clicks on a link in a web page, the user would be hijacked to endorse a low quality product without any notice. Under this circumstance, the low quality product may be incorrectly perceived as a high quality product and gain favor in a search engine (or, a recommendation engine, a rating engine, etc.) because of numerous fake endorsements associated with it.

Existing solutions only slow down the malicious clickjacking and/or abuse of endorsement events by focusing on changes on a user interface for performing an endorsement event. For example, existing solutions pop up a dialog in a user interface requesting a user to confirm or cancel an endorsement event whenever the user performs or is hijacked to perform an endorsement event. The dialog details the endorsement event such as what product this endorsement event approves. In this case, if the endorsement event is hijacked, the user may cancel the endorsement event by clicking a "cancel" button on the dialog. However, these existing solutions require a user to take effort to fight against fraudulent endorsement events.

SUMMARY

The present disclosure overcomes the deficiencies and limitations of the prior art at least in part by providing a system for protecting endorsement events against any anomalous behavior. In some embodiments, the system comprises an endorsement protection module for protecting the one or more endorsement events. The endorsement protection module includes a communication module, a data collecting module, an activity recording module, an aggregation module, a detection module, an action module, a review module and a user interface module. The data collecting module collects event data describing one or more endorsement events. The activity recording module records activity data associated with the one or more endorsement events. The aggregation module aggregates the activity data. The detection module detects, based at least in part on the aggregation of the activity data, one or more anomalies associated with the one or more endorsement events. The action module takes one or more protection actions responsive to the detection of the one or more anomalies.

The aggregation module is configured to aggregate the activity data to create one or more aggregation data structures or tables. The one or more aggregation tables include one or more of a user table and a target table. In some embodiments, the aggregation module is configured to: determine an aggregation level; generate an aggregation value for the aggregation level from the activity data; and store the aggregation value in an aggregation table. The aggregation value represents a number of endorsement events performed in the aggregation level.

The detection module is configured to detect the one or more anomalies based at least in part on one or more aggregation tables. In some embodiments, the detection module is configured to: determine an aggregation level; retrieve an aggregation value associated with the aggregation level from an aggregation table; and detect the one or more anomalies based at least in part on the aggregation value.

The review module is configured to: generate one or more review leads for the one or more anomalies; and provide the one or more review leads to a reviewer.

The action module is configured to: receive one or more review verdicts for the one or more review leads; and update a decision history based at least in part on the one or more review verdicts. In some embodiments, the action module is configured to determine one or more suspicious targets associated with the one or more anomalies, and add the one or more suspicious targets to a blacklist.

In some embodiments, the system further includes a backend adapter. The backend adapter identifies one or more targets associated with the one or more endorsement events and determines whether the one or more targets are in a blacklist. The backend adapter blocks the one or more endorsement events responsive to the determination that the one or more targets are in the blacklist.

The present disclosure also includes a method for protecting endorsement events against anomalous behaviors comprising: collecting event data describing one or more endorsement events; recording activity data associated with the one or more endorsement events; aggregating the activity data; detecting, based at least in part on the aggregation of the activity data, one or more anomalies associated with the one or more endorsement events; and taking one or more protection actions responsive to the detection of the one or more anomalies.

The present disclosure is particularly advantageous in a number of respects. First, the system is advantageous because it detects any anomaly associated with endorsement events based at least in part on aggregation of endorsement events on the server side. Thus, the system does not require a user to take any effort such as confirming or denying an endorsement event for the detection of the anomaly. Second, the system also provides protection actions to fight against any anomaly based on server side information only. The system provides numerous protection actions to protect the endorsement events if any anomaly is detected. Third, the system also includes a backend adapter for buffering endorsement traffic and delivering the endorsement traffic to the endorsement protection module so that heavy traffic from numerous entities is minimized for the endorsement protection module.

BRIEF DESCRIPTION OF THE DRAWINGS

The present disclosure is illustrated by way of example, and not by way of limitation in the figures of the accompanying drawings in which like reference numerals are used to refer to similar elements.

FIG. 8 is a flow chart illustrating a method for detecting one or more anomalies associated with one or more endorsement events according to some embodiments of the present disclosure.

DETAILED DESCRIPTION

Example Overview

Figure 1:
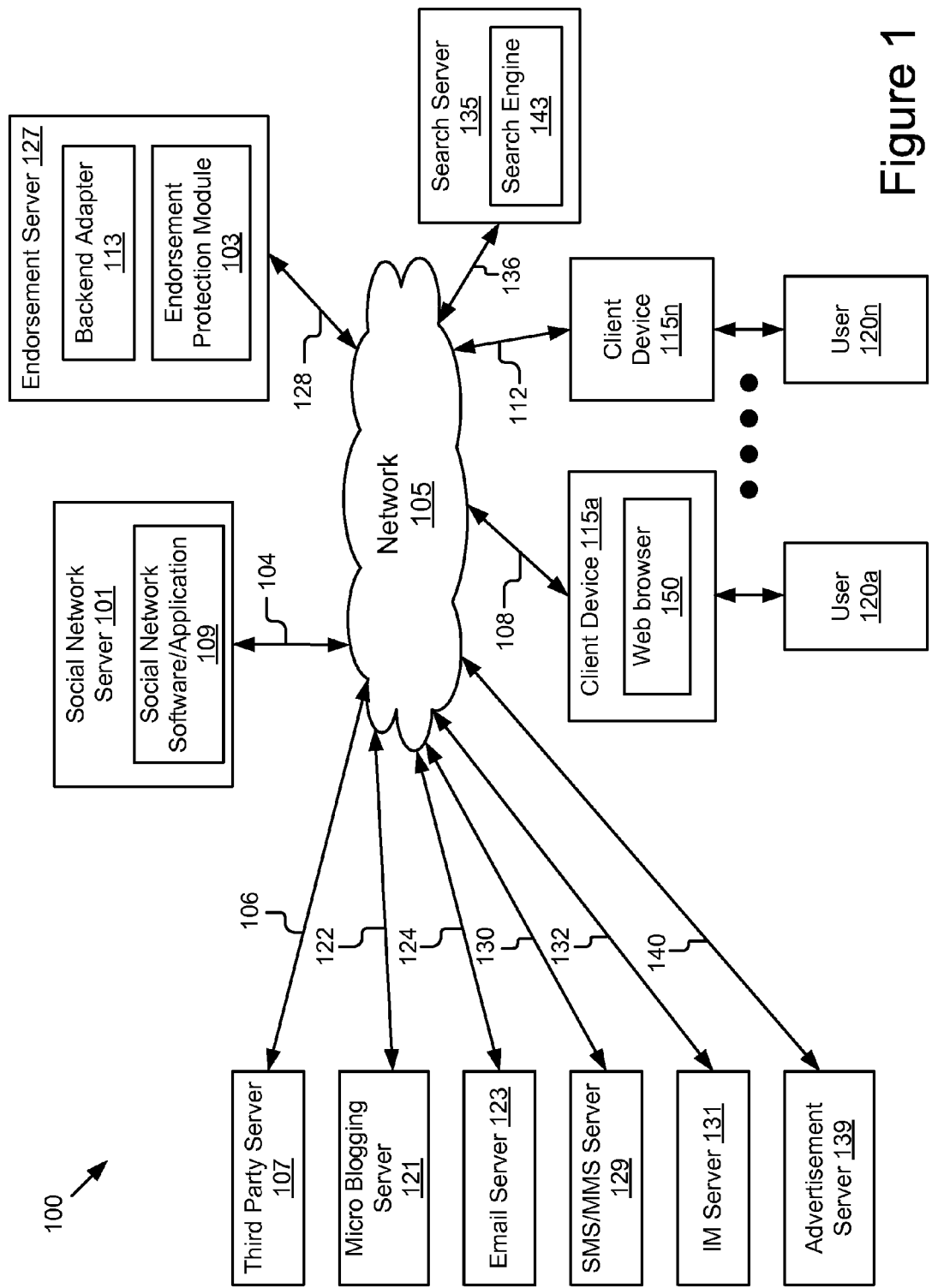
FIG. 1 is a high-level block diagram illustrating a system for protecting endorsement events according to some embodiments of the present disclosure.

The description includes a system and associated method for protecting endorsement events against anomalous behaviors according to some examples. In some embodiments, the system includes an endorsement protection module for protecting endorsement events. A user performs endorsement events when endorsing a product, a video, a search result, a widget, a post, a comment, a photo and/or an article, etc., on a target (e.g., an online service site). The endorsement protection module receives data describing the endorsement events from the target. The endorsement protection module aggregates activity data associated with the endorsement events (e.g., an event timestamp indicating when the endorsement events were performed, a user ID identifying the user, a target ID identifying the online service site, etc.) to generate one or more of a user table and a target table. The endorsement protection module detects whether any anomaly (e.g., a quota anomaly, etc.) occurs based at least in part on the user table and/or the target table. If an anomaly is detected, the endorsement protection module takes one or more protection actions to protect the endorsement events.

As an example of the use of the system, the endorsement protection module determines a total number of endorsement events that a user performs on various targets (e.g., online service sites, web pages, etc.) in a minute, an hour, a day, etc., and stores the total number of endorsement events in a minute, an hour, a day, etc., as aggregation values in a user table. The endorsement protection module determines whether any anomalous behavior (e.g., clickjacking, endorsement abusing and/or spamming, etc.) occurs based on the aggregation values. For example, if a quota for a user to perform endorsement events in an hour is not greater than 5 endorsement events, an anomalous behavior may occur if more than 100 endorsement events are received from the user in an hour (e.g., the user may be high jacked to perform the endorsement events). If the endorsement protection module detects any anomalous behavior for the user, one or more actions will be taken to protect the endorsement events such as limiting the number of endorsement events that the user can perform in an hour, a day, etc., and/or ignoring excessive endorsement events performed by the user, etc.

As another example of the use of the system, the endorsement protection module determines a total number of endorsement events that are performed on a target (e.g., an online service site) in a minute, an hour, a day, etc., and stores the total number of endorsement events in a minute, an hour, a day, etc., as aggregation values in a target table. The endorsement protection module determines whether any anomalous behavior (e.g., endorsement abusing on the target) occurs based on the aggregation values. For example, if an aggregation speed for the endorsement events accelerates suspiciously on the target (e.g., the aggregation speed increases 100 times in the next hour comparing to the previous hour), an anomalous behavior may occur (e.g., the target may be abused with endorsement events). If the endorsement protection module detects any anomalous behavior for the target, one or more actions will be taken to protect the endorsement events such as adding the target to a blacklist and/or ignoring excessive endorsement events performed on the target, etc.

System Overview

FIG. 1 illustrates a high-level block diagram of a system 100 for protecting endorsement events according to some embodiments of the present disclosure. The illustrated system 100 includes client devices 115a-115n (also referred to herein individually and collectively as 115) that are accessed by users 120a-120n (also referred to herein individually and collectively as 120), and an endorsement server 127 having a backend adapter 113 and an endorsement protection module 103. The system 100 also includes a number of products or services offered by a social network server 101, a third party server 107, a micro blogging server 121, an email server 123, a Short Message Service (SMS)/Multimedia Messaging Service (MMS) server 129, an Instant Messaging (IM) server 131, a search server 135 and an advertisement server 139. In the illustrated embodiment, these entities are communicatively coupled via a network 105. These other systems 101, 107, 121, 123, 129, 131, 135 and 139 are merely examples and the system 100 in some embodiments includes a document server, a blogging server, a news feed server, a video sharing server, a photo sharing server, a map server and any other third party server, etc.

The client devices 115a-115n in FIG. 1 are used by way of example. While FIG. 1 illustrates two client devices 115a and 115n, the present disclosure applies to any system architecture having one or more client devices 115. Furthermore, while only one network 105 is coupled to the client devices 115a-115n, the endorsement server 127 and the other product servers 101, 107, 121, 123, 129, 131, 135 and 139, in practice one or more networks 105 can be connected to the entities. Furthermore, while only one third party server 107 is shown, the system 100 could include one or more third party servers 107.

In some embodiments, the social network server 101 is coupled to the network 105 via signal line 104. The social network server 101 also includes a social network software/application 109. Although only one social network server 101 is shown, it should be recognized that multiple servers may be present. A social network is any type of social structure where the users are connected by a common feature. The common feature includes relationships/connections, e.g., friendship, family, work, an interest, etc. The common features are provided by one or more social networking systems, such as those included in the system 100, including explicitly-defined relationships and relationships implied by social connections with other online users, where the relationships form a social graph. In some examples, the social graph can reflect a mapping of these users and how they are related. Furthermore, it should be understood that the social network server 101 and the social network software/application 109 are representative of one social network and that there may be multiple social networks coupled to the network 105, each having its own server, application and social graph. For example, a first social network is more directed to business networking, a second is more directed to or centered on academics, a third is more directed to local business, a fourth is directed to dating and others of general interest or a specific focus.

While shown as operational on the endorsement server 127 in FIG. 1, in some embodiments all or part of the endorsement protection module 103 may be operational on the third party server 107 or any other servers 101, 121, 123, 129, 131, 135 and 139. The endorsement protection module 103 interacts with the other servers 101, 107, 121, 123, 129, 131, 135 and 139 via the network 105. The endorsement protection module 103 is also coupled for communication with the client device 115a, which is connected to the network 105 via signal line 108. The user 120a interacts with the client device 115a. Similarly, the client device 115n is coupled to the network 105 via signal line 112 and the user 120n interacts with the client device 115n. It should be recognized that the endorsement protection module 103 can be stored in any combination of the devices and servers, or in only one of the devices or servers.

The network 105 is a conventional type, wired or wireless, and may have any number of configurations such as a star configuration, token ring configuration or other configurations. Furthermore, the network 105 may comprise a local area network (LAN), a wide area network (WAN) (e.g., the Internet), and/or any other interconnected data path across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The endorsement server 127 is coupled by signal line 128 to the network 105 for communication and cooperation with the other components of the system 100. The endorsement server 127 interacts with the third party server 107 that is coupled to the network 105 via signal line 106, the micro blogging server 121 that is coupled to the network 105 via signal line 122, the email server 123 that is coupled to the network 105 via signal line 124, the Short Message Service (SMS)/Multimedia Messaging Service (MMS) server 129 that is coupled to the network 105 via signal line 130, the instant messaging (IM) server 131 that is coupled to the network 105 via signal line 132, the search server 135 that is coupled to the network 105 via signal line 136, and/or the advertisement server 139 that is coupled to the network 105 via signal line 140.

In some embodiments, the endorsement server 127 monitors any endorsement service provided by the other systems 101, 107, 121, 123, 129, 131, 135 and 139. For example, the endorsement server 127 monitors for any endorsement events performed on any web pages and/or applications hosted by the other systems 101, 107, 121, 123, 129, 131, 135 and 139. The web pages and/or applications include a user interface allowing a user to endorse a product, a video, a search result, a widget, a post, a comment, a photo, an article, etc., shown on the web pages and/or applications. In some embodiments, an endorsement event is a positive endorsement event. For example, a positive endorsement event indicates that a user approves a product. In some embodiments, an endorsement event is a negative endorsement event. For example, a negative endorsement event indicates that a user disapproves a product.

In some embodiments, the endorsement server 127 receives and stores event data describing one or more endorsement events performed on the other systems 101, 107, 121, 123, 129, 131, 135 and/or 139. In some embodiments, the endorsement server 127 receives and sends information from and to the other systems 101, 107, 121, 123, 129, 131, 135 and 139 that allow the users 120a-120n to access the endorsement services provided by those systems 101, 107, 121, 123, 129, 131, 135 and 139. In some embodiments, the endorsement server 127 cooperates with the other systems 101, 107, 121, 123, 129, 131, 135 and 139 to enable or disable the endorsement service provided by those other systems 101, 107, 121, 123, 129, 131, 135 and 139.

In some embodiments, the endorsement server 127 interacts with a client device 115 to receive the event data from the client device 115 operated by a user 120. For example, a user 120 operated on a client device 115 clicks on an endorsement icon (e.g., a "liked" icon, a "favorite" icon, a "plus one" icon, etc.) to endorse a video presented by a web browser 150 comprised within the client device 115, causing the client device 115 to send data describing the endorsement event to the endorsement server 127. In some embodiments, the endorsement server 127 receives event data describing an endorsement of a search result from the search server 135. In the illustrated example, the search server 135 includes a search engine 143 for retrieving results that match search terms from the Internet.

In the illustrated example, the endorsement server 127 includes a backend adapter 113 and an endorsement protection module 103. The backend adapter 113 and the endorsement protection module 103 interacts with other systems 101, 107, 115a-115n, 121, 123, 129, 131, 135 and 139 to provide the functionality described herein. The backend adapter 113 and the endorsement protection module 103 are described in more detail below with reference to FIGS. 2-3B and 5-9.

In some embodiments, the social network server 101, the third party server 107, the micro blogging server 121, the email server 123, the endorsement server 127, the SMS/MMS server 129, the IM server 131, the search server 135 and the advertisement server 139 are hardware servers including a processor, a memory, and network communication capabilities. The client devices 115 can be portable computing devices. It should be understood that these systems 101, 107, 115, 121, 123, 127, 129, 131, 135 and 139 could be any computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. As will be described below, it should be understood that the present technologies can operate on different models other than a client-server architecture. For example, the client devices 115 may include the endorsement protection module 103 and include different services.

Endorsement Server

Figure 2:
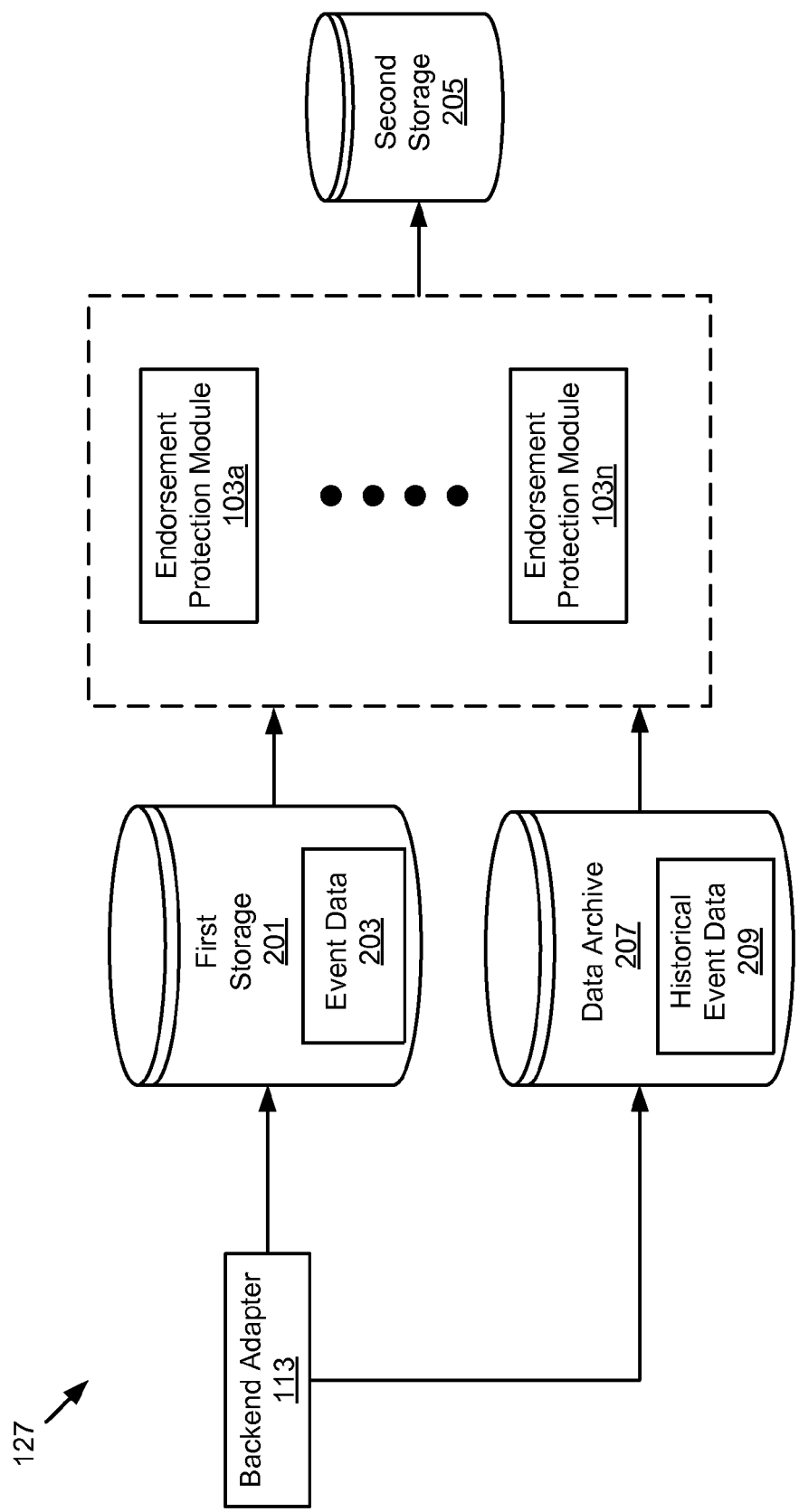
FIG. 2 is a block diagram illustrating an endorsement server according to some embodiments of the present disclosure.

FIG. 2 illustrates the endorsement server 127 according to some embodiments of the present disclosure. In the illustrated example, the endorsement server 127 includes the backend adapter 113, a first storage device 201, a second storage device 205, a data archive 207 and one or more endorsement protection modules 103a-103n (also referred to herein individually and collectively as 103). These components of the endorsement server 127 are communicatively coupled to each other.

The backend adapter 113 can be software or routines for delivering event data describing one or more endorsement events to the endorsement protection module 103. For example, the backend adapter 113 receives event data describing one or more endorsement events from one or more of the other systems 101, 107, 115a-115n, 121, 123, 129, 131, 135 and/or 139 and delivers the event data to the endorsement protection modules 103a-103n asynchronously. In some embodiments, the backend adapter 113 buffers the event data in the first storage 201 temporarily and the endorsement protection modules 103a-103n retrieve the event data from the first storage 201. In some embodiments, the backend adapter 113 delivers the event data to the endorsement protection modules 103a-103n directly. The backend adapter 113 may also store the event data as a part of historical event data 209 in the data archive 207.

It is particularly beneficial to incorporate a backend adapter 113 in the endorsement server 127 for diverting endorsement traffic (e.g., event data) to the endorsement protection modules 103a-103n since, for example, the backend adapter 113 allows the endorsement protection modules 103a-103n to process the event data asynchronously without causing significant latency. The backend adapter 113 also buffers the endorsement traffic temporally in a storage (e.g., storage 201), which reduces stress on heavy traffic management in the endorsement protection modules 103a-103n. The backend adapter 113 therefore allows the endorsement protection modules 103a-103n to process endorsement traffic from worldwide servers and/or entities.

In some embodiments, the backend adapter 113 identifies one or more targets associated with the one or more endorsement events. A target associated with an endorsement event is an entity that an endorsement event endorses. For example, a target is a uniform resource locator (URL) that an endorsement event approves. Other examples of a target include a mobile application, a web page, a widget, a search result, a video, a news feed, a comment, a post and any other products/services, etc.

The backend adapter 113 retrieves data describing a blacklist of targets from the second storage 205 and determines whether the identified targets are in the blacklist. A blacklist of targets is data describing one or more suspicious targets. The suspicious target is described below with reference to FIG. 3B. If the identified targets are in the blacklist, the backend adapter 113 blocks the one or more endorsement events associated with the identified targets. For example, the backend adapter 113 drops the event data associated with the targets in the blacklist and does not deliver the event data to the endorsement protection modules 103a-103n for further processing.

In some embodiments, the backend adapter 113 receives a review verdict and/or feedback data associated with a review lead from a computing device (not pictured) operated by a reviewer (not pictured). In some embodiments, a reviewer is a human user. In some embodiments, a reviewer is code and routines for performing reviewing procedures. The review verdict and review lead are described below with reference to FIG. 3B. The backend adapter 113 delivers the review verdict and/or the feedback data to the endorsement protection modules 103a-103n.

The first storage 201 is a non-transitory memory that stores data. For example, the first storage 201 is a dynamic random access memory (DRAM) device, a static random access memory (SRAM) device, flash memory or some other memory device known in the art. In one embodiment, the first storage 201 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In the illustrated example, the first storage 201 stores event data 203 that describes one or more endorsement events. The event data 203 includes one or more of: an event timestamp when an endorsement event is performed (e.g., Feb. 15, 2012, 19:14:24); a widget identifier (ID) associated with the endorsement event (e.g., an ID for a mobile application widget); a publisher ID identifying a publisher of a widget; a user ID identifying a user that performs the endorsement event (e.g., a user name, an email address or an internet protocol (IP) address of the user, etc.); and a target ID identifying a target of the endorsement event (e.g., an email address, a circle ID, a group ID, a URL, a product, a video, a post, a comment, an advertisement, etc.), etc. It should be recognized that the event data 203 may include any other data associated with endorsement events for providing the functionality described herein.

The data archive 207 is a non-transitory memory that stores data. For example, the data archive 207 is a dynamic random access memory (DRAM) device, a static random access memory (SRAM) device, flash memory or some other memory device known in the art. In one embodiment, the data archive 207 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art.

In some embodiments, the data archive 207 stores historical event data 209 collected from the other systems 101, 107, 115a-115n, 121, 123, 129, 131, 135 and 139. The historical event data 209 is event data collected in the past. For example, the historical event data 209 includes all the event data collected since the first day when the endorsement service was provided. In some embodiments, the historical event data 209 is used to train the endorsement protection modules 103a-103n so that after the training the endorsement protection modules 103a-103n are ready to detect any anomaly associated with endorsement events.

The endorsement protection modules 103a-103n can be software or routines for protecting one or more endorsement events against any anomalous behaviors. An anomalous behavior may be, for example, a clickjacking, an abuse and/or a spam of an endorsement event. A clickjacking of an endorsement event is a malicious technique of tricking users to endorse any product and/or service that they do not intentionally mean to endorse. For example, a clickjacking of an endorsement event occurs when a user appears to click on a "play" button of a video but turns out to be hijacked to endorse a product when clicking the "play" button.

In some embodiments, the endorsement protection modules 103a-103n retrieve event data from the first storage 201 and/or the data archive 207 and process the event data asynchronously. The endorsement protection modules 103a-103n store the processing results in the second storage 205. The endorsement protection modules 103a-103n may also detect one or more anomalies associated with one or more endorsement events and take actions to protect the one or more endorsement events. In some embodiments, each of the endorsement protection modules 103a-103n operates in parallel with each other. The endorsement protection module 103 is described in more detail below with reference to FIGS. 3B and 5-9.

The second storage 205 is a non-transitory memory that stores data. For example, the second storage 205 is a dynamic random access memory (DRAM) device, a static random access memory (SRAM) device, flash memory or some other memory device known in the art. In one embodiment, the second storage 205 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The second storage 205 is described in more detail below with reference to FIG. 4.

Example System

Figure 3A:
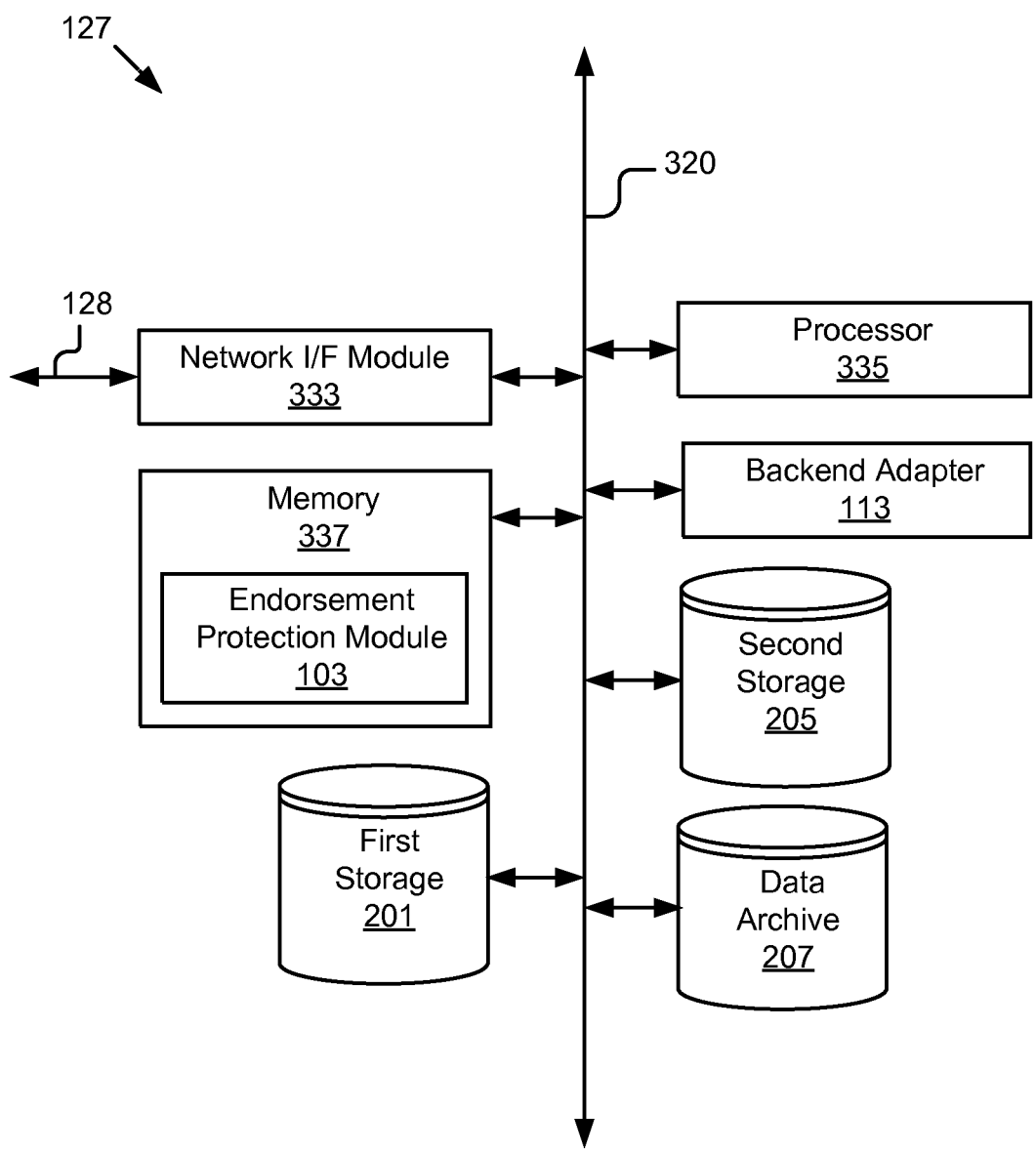
FIG. 3A is a block diagram illustrating a hardware architecture for protecting endorsement events according to some embodiments of the present disclosure.

FIG. 3A illustrates a hardware architecture for protecting endorsement events according to some embodiments of the present disclosure. In this embodiment, the endorsement server 127 comprises a network interface (I/F) module 333, a processor 335, a memory 337, the backend adapter 113, the first storage 201, the second storage 205 and the data archive 207. These components of the endorsement server 127 are communicatively coupled to a bus 320 for communication with each other.

The network interface module 333 is coupled to the network 105 by signal line 128. The network interface module 333 is also coupled to the bus 320. The network interface module 333 includes ports for wired connectivity such as but not limited to USB, SD, or CAT-5, etc. The network interface module 333 links the processor 335 to the network 105 that may in turn be coupled to other processing systems. The network interface module 333 provides other conventional connections to the network 105 using standard network protocols such as TCP/IP, HTTP, HTTPS and SMTP. In some embodiments, the network interface module 333 includes a transceiver for sending and receiving signals using WiFi, Bluetooth® or cellular communications for wireless communication.

The processor 335 comprises an arithmetic logic unit, a microprocessor, a general purpose controller or some other processor array to perform computations and provide electronic display signals to a display device. The processor 335 is coupled to the bus 320 for communication with the other components. Processor 335 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3A, multiple processors may be included. It should be understood that other processors, operating systems, sensors, displays and physical configurations are possible.

The memory 337 stores instructions and/or data that may be executed by the processor 335. In the illustrated embodiment, the memory 337 stores the endorsement protection module 103. The memory 337 is coupled to the bus 320 for communication with the other components. The instructions and/or data may comprise code for performing any and/or all of the techniques described herein. The memory 337 may be a dynamic random access memory (DRAM) device, a static random access memory (SRAM) device, flash memory or some other memory device known in the art.

The backend adapter 113, the first storage 201 and the data archive 207 are described above with reference to FIG. 2, and the descriptions will not be repeated here. The second storage 205 will be described below in more detail with reference to FIG. 4.

Endorsement Protection Module

Figure 3B:
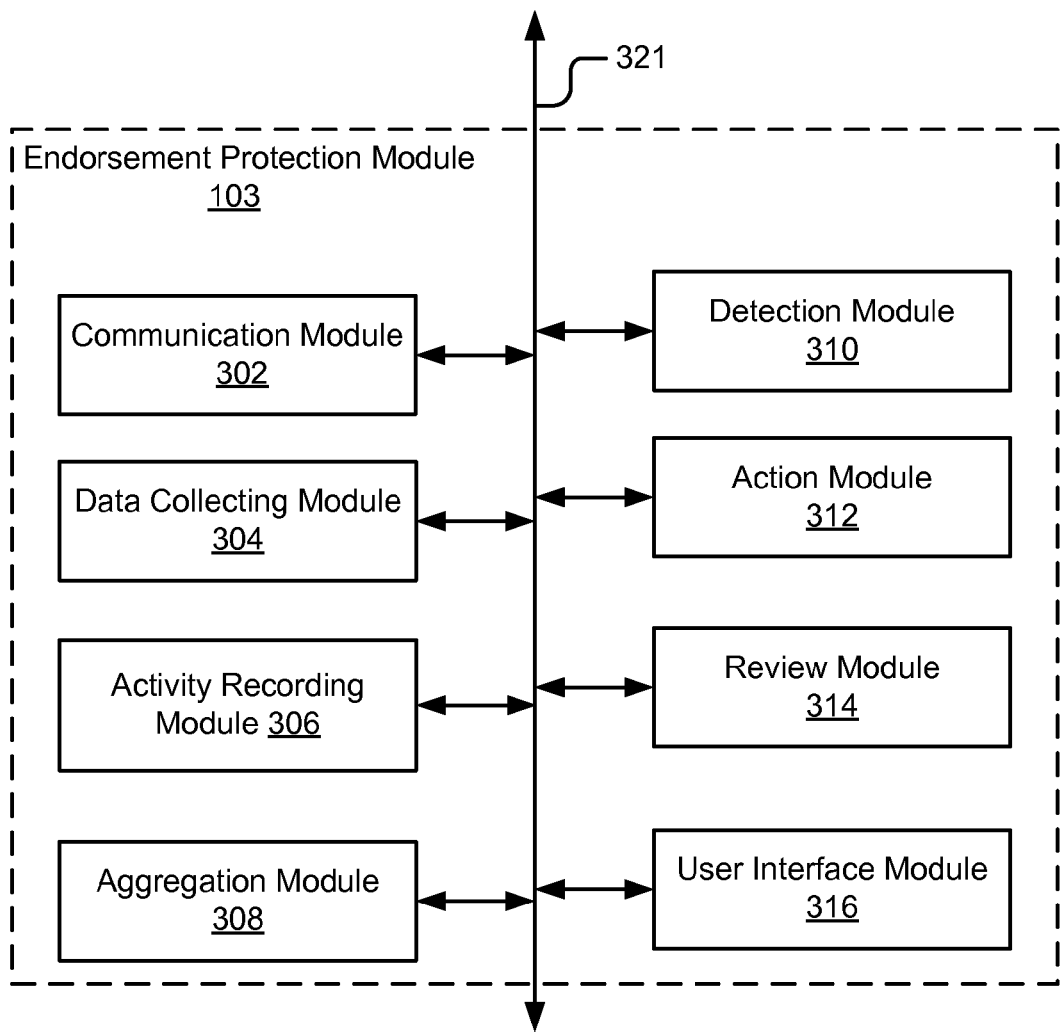
FIG. 3B is a block diagram illustrating an endorsement protection module in an endorsement server according to some embodiments of the present disclosure.

As shown in FIG. 3B, the endorsement protection module 103 is described in more detail. The endorsement protection module 103 includes a communication module 302, a data collecting module 304, an activity recording module 306, an aggregation module 308, a detection module 310, an action module 312, a review module 314 and a user interface module 316. Each of these components is coupled to the software communication mechanism 321 for communication with each other and the other components of the endorsement server 127. Software communication mechanism 321 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc). The software communication can be implemented on any underlying hardware, such as a network, the Internet, a bus 320, a combination thereof, etc.

The communication module 302 can be software or routines for handling communications between components of the endorsement protection module 103 and other components of the endorsement server 127. The communication module 302 is coupled to the software communication mechanism 321 for communication with other components of the endorsement protection module 103 and/or other components of the endorsement server 127. In some embodiments, the communication module 302 receives data from the backend adapter 113 and/or the network interface module 333 and sends the data to other components of the endorsement protection module 103 such as the data collecting module 304.

In some embodiments, the communication module 302 retrieves data from one or more of the storage 201, 205 and/or the data archive 207 and sends the data to other components of the endorsement protection module 103. In some embodiments, the communication module 302 receives data from other components of the endorsement protection module 103 such as the aggregation module 308 and stores the data in the second storage 205. It should be understood that the communication module 302 may provide any other functionality for handling communications among components of the endorsement server 127.

The data collecting module 304 can be software or routines for collecting event data. The data collecting module 304 is coupled to the software communication mechanism 321 for communication with other components of the endorsement protection module 103 such as the communication module 302 and the activity recording module 306. In some embodiments, the data collecting module 304 retrieves, via the communication module 302, event data from one or more of the data archive 207 and/or the storage 201, 205. In some embodiments, the data collecting module 304 periodically collects event data from various entities such as the other systems 101, 107, 115, 121, 123, 129, 131, 135 and 139, etc., via the communication module 302, the backend adapter 113 and the network interface module 333. The data collecting module 304 sends the collected event data to the activity recording module 306.

In some embodiments, the data collecting module 304 monitors one or more entities (e.g., other systems 101, 107, 115, 121, 123, 129, 131, 135 and 139, etc.) for any endorsement events and collects event data describing one or more endorsement events from the one or more entities in real time via the communication module 302, the backend adapter 113 and the network interface module 333. It is particularly desirable for the data collecting module 304 to collect event data in real time because, for example, it allows the endorsement protection module 103 to aggregate the event data and detect any anomalies associated with the endorsement events close to real time.

The activity recording module 306 can be software or routines for recording activity data associated with one or more endorsement events. In some embodiments, the activity recording module 306 is coupled to the software communication mechanism 321 for communication with other components of the endorsement protection module 103 such as the data collecting module 304 and the aggregation module 308. The activity recording module 306 receives event data describing one or more endorsement events from the data collecting module 304 and determines activity data for each of the one or more endorsement events.

Activity data associated with an endorsement event includes one or more of an event timestamp indicating when the endorsement event was performed, a user ID identifying a user that has performed the endorsement event, a target ID identifying a target of the endorsement event, a spam signal indicating whether the endorsement event is a spam, a unique event ID identifying the endorsement event and/or an activity key for the endorsement event.

In some embodiments, the activity recording module 306 determines a unique event ID for an endorsement event based at least in part on one or more of an event timestamp, a server ID identifying a server that provides the endorsement service, a process ID identifying a process to perform the endorsement event, etc. For example, the activity recording module 306 determines a unique event ID for an endorsement event as a concatenation of a hexadecimal value of an event timestamp, a hexadecimal value of a server ID and a hexadecimal value of a process ID, etc. The activity recording module 306 determines an activity key for the endorsement event as a fingerprint of the unique event ID such as a hashed value of the unique event ID. This allows the endorsement events to be uniquely identified in further processing. It also allows activity data having the same associated unique event ID to be grouped with the same endorsement.

In some embodiments, the activity recording module 306 creates an activity table and populates the activity table with the activity data. For example, the activity recording module 306 indexes each endorsement event in the activity table using the activity key of the endorsement event and stores all the other activity data associated with the endorsement event under the index of the activity key. In some embodiments, the activity table lists all the activity data associated with all the endorsement events performed by all the users. It is particularly desirable to index each endorsement event using a unique activity key in the activity table, since this indexing allows a fast retrieval of the activity data by looking up the activity key in the table.

The aggregation module 308 can be software or routines for aggregating activity data. In some embodiments, the aggregation module 308 is coupled for communication with the activity recording module 306, the detection module 310 and the second storage 205, etc. In some embodiments, the aggregation module 308 aggregates the activity data to create one or more aggregation tables. An aggregation table is a table for storing aggregation results. For example, an aggregation table is one of a user table and a target table. The aggregation module 308 populates the user table and the target table with the aggregation results.

A user table includes data describing an aggregation of endorsement events for one or more users. For example, a user table includes one or more sections with each section including data describing an aggregation of endorsement events performed by a single user. Each section of the user table is indexed by a user key of a user associated with the specific section. A user key is a signature of a user ID. For example, a user key is a string presentation of a decimal encoding of a user ID. In some embodiments, a user key of a user identifies a section of a user table associated with the user.

Each section of a user table includes an activity column, a target column, an aggregation column and a verdict column. The activity column includes activity keys associated with endorsement events performed by the user. In some embodiments, the activity keys are used to retrieve activity data associated with the endorsement events from an activity table. A target column includes target IDs for which the user has created or deleted the endorsements. In some embodiments, a target ID in the target column is stamped by a fingerprint of a unique event ID that identifies the endorsement event associated with the target ID. The verdict column includes review verdicts associated with the user.

The aggregation column includes all the aggregation results for the user in different aggregation levels (e.g., a minute aggregation level, an hour aggregation level and a day aggregation level, etc.). An aggregation result includes an aggregation level, an aggregation date when the aggregation is performed and an aggregation value indicating the number of endorsement events that the user has performed in the specific aggregation level. For example, an aggregation result with a day aggregation level, an aggregation date of Feb. 1, 2012 and an aggregation value of ten indicates that the user has performed ten endorsement events on the day of Feb. 1, 2012. The content included in a section of a user table is summarized in Table 1.

TABLE 1

Summary of Content Included in a Section of a User Table
Index: User Key

| Activity Column | Target Column | Aggregation Column | Verdict Column |
|---|---|---|---|
| Activity key | Target ID | Aggregation result (Aggregation level, aggregation date, aggregation value) | Review verdict |

A target table includes data describing an aggregation of endorsement events for one or more targets. For example, a target table includes one or more sections with each section including data describing an aggregation of endorsement events for a single target. Each section of the target table is indexed by a target key. A target key is a fingerprint of a target ID. For example, a target key is a string presentation of a fingerprint of a target ID concatenated with the target ID. The target key identifies a section associated with a target in a target table.

Each section of a target table includes an activity column, a user column, an aggregation column and a verdict column. The activity column includes activity keys associated with endorsement events for the target ID. In some embodiments, the activity keys are used to retrieve activity data associated with the endorsement events from an activity table. A user column includes user IDs identifying users that have endorsed the target ID. The verdict column includes review verdicts associated with the target ID.

The aggregation column includes all the aggregation results for the target ID in different aggregation levels. An aggregation result includes an aggregation level, an aggregation date when the aggregation is performed and an aggregation value indicating the number of endorsement events that has performed for the target ID in the aggregation level. For example, an aggregation result with a day aggregation level, an aggregation date of Feb. 1, 2012 and an aggregation value of ten indicates that ten endorsement events have been performed for the target ID on the day of Feb. 1, 2012. The content included in a section of a target table is summarized in Table 2.

TABLE 2

Summary of Content Included in a Section of a Target Table
Index: Target Key

| Activity Column | User Column | Aggregation Column | Verdict Column |
|---|---|---|---|
| Activity key | User ID | Aggregation result (Aggregation level, aggregation date, aggregation value) | Review verdict |

In some embodiments, the aggregation module 308 determines an aggregation level (e.g., a minute/hour/day/week aggregation level) and aggregates the activity data to generate an aggregation value indicating the number of endorsement events that a user has performed in the specific aggregation level. The aggregation module 308 stores the aggregation value for the user in the user table. In some embodiments, the aggregation module 308 determines an aggregation level and aggregates the activity data to generate an aggregation value indicating the number of endorsement events that have been performed for a target in the specific aggregation level. The aggregation module 308 stores the aggregation value for the target in the target table. The operations for aggregating the activity data to generate an aggregation value for a user and/or a target are described in more detail below with reference to FIGS. 7A and 7B. It should be understood that any other possible aggregations are possible, and that various other similar tables or other data structures adapted to those aggregations may be used.

In some embodiments, the aggregation of the activity data is a time-based aggregation. The aggregation module 308 applies time windows (e.g., a sixty-minute time window, a twenty-four hour time window, etc.), and aggregates the activity data for each of the time windows. The aggregation module 308 receives endorsement events performed during a time window and updates the aggregation of activity data in the time window. If the endorsement events received are not in the consideration of the current time window, in some embodiments the aggregation module 308 drops the event data, or the aggregation module 308 still updates the aggregation of activity data using the event data.

In some embodiments, the aggregation module 308 aggregates the activity data in terms of an arbitrary element. For example, the aggregation module 308 aggregates the activity data to generate an aggregation value indicating one of: the total number of endorsement events that are performed across all the targets and all the users in a minute, an hour, a day and/or a week; the number of endorsement events performed in a particular country (e.g., United States) in a minute, an hour, a day and/or a week; and the number of endorsement events that are deleted in a minute, an hour, a day and/or a week, etc.

In some embodiments, the aggregation module 308 stores the aggregation data (e.g., data included in a user table and/or target table) in the second storage 205. The aggregation module 308 may also send the aggregation data to the detection module 310.

The detection module 310 can be software or routines for detecting anomalies associated with endorsement events. In some embodiments, the detection module 310 is coupled for communication with the aggregation module 308, the action module 312, the review module 314 and the second storage 205. An anomaly is any suspicious behavior associated with one or more endorsement events. For example, an anomaly includes one or more of a quota anomaly, a velocity anomaly, an entropy anomaly and a geo-location anomaly.

A quota anomaly is a quota violation that the aggregation of endorsement events exceeds a quota in a specific aggregation level (or, in a predefined period of time). In some embodiments, a quota for a user or a target in a specific aggregation level is predefined by an administrator of the endorsement server 127. In some embodiments, a quota is configurable by the endorsement server 127. A predefined period of time includes any period of time predefined by an administrator or the endorsement server 127. For example, a predefined period of time is one of a minute, an hour and a day, etc., corresponding to a minute aggregation level, an hour aggregation level and a day aggregation level, etc., respectively.

In some embodiments, if a user performs more endorsement events than a quota in an aggregation level (or, in a predefined period of time), a quota anomaly for the user occurs. For example, if a first quota for a single user in an hour is not greater than five endorsement events, a quota anomaly for a user occurs in an hour aggregation level if the user performs more than five endorsement events in an hour.

In some embodiments, if the number of endorsement events performed for a target in a predefined period of time exceeds a quota, a quota anomaly for the target occurs. For example, if a second quota for a single target in a minute includes ten endorsement events, a quota anomaly for the target occurs in a minute aggregation level if more than ten endorsement events for the target are performed in a minute.

A velocity anomaly is a velocity violation that an aggregation speed of endorsement events exceeds a speed threshold in an aggregation level. For example, if an aggregation speed of endorsement events accelerates suspiciously (e.g., the aggregation speed increases ten times in the next hour), a velocity anomaly occurs. An aggregation speed indicates the number of endorsement events performed per minute, per hour or per day, etc., for a user or a target. In some embodiments, a speed threshold is predefined by an administrator of the endorsement server 127. In some embodiments, a speed threshold is configurable by the endorsement server 127.

In some embodiments, if an aggregation speed for a user in a specific aggregation level exceeds a first speed threshold for a single user in the specific aggregation level, a velocity anomaly for the user occurs in the aggregation level. In some embodiments, if an aggregation speed for a target in a specific aggregation level exceeds a second speed threshold for a single target in the specific aggregation level, a velocity anomaly for the target occurs in the aggregation level.

An entropy anomaly is an entropy violation that an aggregation entropy for endorsement events is below an entropy threshold in a specific aggregation level. An aggregation entropy is a measure of uncertainty associated with the aggregation of endorsement events. For example, an aggregation entropy indicates how much new information is included in the aggregation of the endorsement events. In some embodiments, an entropy threshold is predefined by an administrator of the endorsement server 127. In some embodiments, an entropy threshold is configurable by the endorsement server 127.

In some embodiments, if an aggregation entropy for a user in a specific aggregation level is below a first entropy threshold for a single user in the specific aggregation level, an entropy anomaly for the user occurs in the aggregation level. In some embodiments, if an aggregation entropy for a target in a specific aggregation level is below a second entropy threshold for a single target in the specific aggregation level, an entropy anomaly for the target occurs in the aggregation level.

A geo-location anomaly is a geo-location violation. In some embodiments, the detection module 310 detects anomalous patterns of access from different geo locations. For example, assume that a user performs a first endorsement event at a first location and, after a period of time, the user performs a second endorsement event at a second location. If a speed of travelling for the user from the first location to the second location exceeds a travel speed threshold, a geo-location anomaly occurs.

In some embodiments, the detection module 310 detects one or more anomalies associated with one or more endorsement events based at least in part on the aggregation of the activity data. For example, the detection module 310 detects one or more anomalies in one or more aggregation levels based at least in part on the aggregation tables (e.g., the user table and/or the target table). In the examples described below, the detection module 310 detects any anomalies associated with any users based at least in part on the user table. Similarly, the detection module 310 detects any anomalies associated with any targets based at least in part on the target table by performing similar operations.

For each aggregation level (e.g., a minute, hour, day or week aggregation level, etc.), the detection module 310 retrieves one or more aggregation values for one or more users in the aggregation level from the user table. The detection module 310 determines whether there is any anomaly in the aggregation level for each user based at least in part on the aggregation value for the user. For example, the detection module 310 determines whether an aggregation value for a user exceeds a quota for a single user in the aggregation level. If the aggregation value exceeds the quota, the detection module 310 detects a quota anomaly for the user.

In some embodiments, the detection module 310 determines an aggregation speed for the user based at least in part on the aggregation value. For example, the detection module 310 determines how many endorsement events the user performs per minute or per hour, etc., based on the aggregation value. The detection module 310 determines whether the aggregation speed exceeds a speed threshold for a single user in the aggregation level. If the aggregation speed is greater than the speed threshold, the detection module 310 detects a velocity anomaly for the user.

The detection module 310 may also determine an aggregation entropy for the user based at least in part on the aggregation value. The detection module 310 determines whether the aggregation entropy is below an entropy threshold for a single user in the aggregation level. If the aggregation entropy is less than the entropy threshold, the detection module 310 detects an entropy anomaly for the user.

By performing operations described above, the detection module 310 determines whether there is any quota anomaly, velocity anomaly and entropy anomaly for the user in each of the aggregation levels. In some embodiments, the detection module 310 also determines whether there is any geo-location anomaly associated with the user.

If any anomaly (e.g., quota anomaly, velocity anomaly, entropy anomaly, or geo-location anomaly, etc.) is detected for the user, the detection module 310 annotates the anomaly and determines the user as a suspicious user. A suspicious user is a user associated with any anomaly. The detection module 310 generates violation data describing the anomaly. In some embodiments, the violation data includes data describing one or more of a type of violation (e.g., a type of anomaly), a time when the anomaly occurred and data explaining why the anomaly was triggered. In some embodiments, violation data for a suspicious user additionally includes a user ID identifying the suspicious user. Violation data for a suspicious target additionally includes a target ID identifying the suspicious target. The detection module 310 sends the violation data to one or more of the action module 312 and the review module 314. In some embodiments, the detection module 310 stores the violation data in the second storage 205.

However, if none of the quota anomaly, velocity anomaly, entropy anomaly and geo-location anomaly is detected, the detection module 310 generates a signal indicating that no anomaly is detected. The detection module 310 sends the signal to the action module 312.

In some embodiments, the detection module 310 detects any anomalies associated with any targets based at least in part on the target table. A target associated with any anomaly is referred to as a suspicious target. The detection module 310 retrieves the aggregation values for one or more targets from the target table. The detection module 310 determines whether there is any anomaly associated with the one or more targets based at least in part on the aggregation values by performing operations similar to those described above. For example, the detection module 310 determines whether there is any quota anomaly, velocity anomaly, entropy anomaly or geo-location anomaly associated with the one or targets based at least in part on the aggregation values for the targets. The descriptions will not be repeated here.

The action module 312 can be software or routines for taking protection actions to protect one or more endorsement events. In some embodiments, the action module 312 is coupled for communication with the detection module 310, the review module 314, the backend adapter 113 and the second storage 205. In some embodiments, the action module 312 receives a signal from the detection module 310 indicating that no anomaly is detected. The action module 312 takes no actions responsive to the signal. In some embodiments, the action module 312 receives violation data describing one or more anomalies from the detection module 310 and takes protection actions against the one or more anomalies.

A protection action includes one or more of: limiting a number of endorsement events that a suspicious user is allowed to perform; limiting a number of endorsement events allowed to be performed on a suspicious target; blocking a suspicious target from providing any endorsement service;

blocking a suspicious user to perform any endorsement event; ignoring and/or dropping endorsement events associated with a suspicious target and/or a suspicious user (e.g., recording the endorsement events associated with suspicious targets and/or suspicious users in a private bookmark so that the endorsement events do not have any impact on search results, recommendation results, rating results, etc.); adding a suspicious target to a blacklist; adding a review verdict to a user table for a user; adding a review verdict to a target table for a target; and updating a decision history for a suspicious user or a suspicious target, etc. Other protection actions are also possible.

In some embodiments, the action module 312 generates a review request responsive to receiving violation data describing an anomaly from the detection module 310. The action module 312 sends the review request to the review module 314, causing the review module 314 to generate a review lead for the anomaly. The review module 314 and review lead are described below. In some embodiments, the action module 312 receives a review verdict for an anomaly from a reviewer via the backend adapter 113 and the communication module 302.

A review verdict is data describing a decision associated with an anomaly from a reviewer. For example, a review verdict indicates that a reviewer considers a detected anomaly as a true anomaly. As another example, a review verdict indicates that a reviewer considers a detected anomaly as a false anomaly. In some embodiments, a review verdict includes one or more of a lead ID identifying a review lead that the review verdict corresponds to, a target ID for a suspicious target or a user ID for a suspicious user, a reviewer ID identifying the reviewer and/or data describing a decision from the reviewer.

The action module 312 maps the review verdict with a suspicious target and/or a suspicious user responsive to receiving the review verdict. For example, the action module 312 processes the review verdict and maps the review verdict to a suspicious target identified by a target ID and/or a suspicious user identified by a user ID included in the review verdict. In some embodiments, the action module 312 delivers the review verdict to any other systems such as the systems 101, 107, 115, 121, 123, 129, 131, 135 and 139.

In some embodiments, the action module 312 creates a cleaning list of targets and adds the suspicious target in the cleaning list. A cleaning list of targets includes one or more suspicious targets that are cleaned immediately when detected. The action module 312 may also add the suspicious target to a blacklist. The action module 312 may also update a decision history for the suspicious user and/or suspicious target in a user table and/or target table. For example, the action module 312 adds the review verdict to the user table and/or target table.

The review module 314 can be software or routines for providing one or more review leads associated with one or more anomalies to a reviewer. In some embodiments, the review module 314 is coupled for communication with the detection module 310, the action module 312, the user interface module 316 and the second storage 205. In some embodiments, the review module 314 receives a review request from the action module 312 and generates a review lead responsive to the review request.

A review lead is a message facilitating a reviewer to review an anomaly. In some embodiments, a review lead includes violation data describing an anomaly, address data describing one or more addresses (e.g., URLs) to retrieve one or more endorsement events associated with the anomaly and/or aggregation data associated with the anomaly from the user table or target table. In some embodiments, a reviewer imports the aggregation data from the second storage 205 using the one or more addresses to assist in the review process. It should be recognized that a review lead may include any other data for providing the functionality described herein.

In some embodiments, the review module 314 sends data describing the review lead to the user interface module 316, causing the user interface module 316 to generate graphical data for providing a user interface to a reviewer. The user interface depicts the review lead. In some embodiments, the review module 314 stores the data describing the review lead in the second storage 205.

The user interface module 316 can be software or routines for providing user interfaces to a user and/or reviewer. In some embodiments, the user interface module 316 is coupled for communication with the web browser 150 of the client device 115, a computing device (not pictured) operated by a reviewer and/or other components of the endorsement server 127. The user interface module 316 cooperates with the review module 314 to generate graphical data for providing a user interface to a reviewer. The user interface depicts one or more review leads associated with one or more anomalies. The user interface module 316 sends the graphical data to a computing device operated by the reviewer, causing the computing device to present the user interface to the reviewer. The reviewer reviews the one or more review leads and creates a review verdict for each of the review leads via the user interface. The reviewer sends the review verdicts to the action module 312 via the backend adapter 113.

In some embodiments, the user interface module 316 generates graphical data for providing a user interface to a user operating on a client device 115. The user interface depicts an aggregation of endorsement events that the user has performed. The user interface module 316 sends the graphical data to the client device 115, causing the client device 115 to present the user interface to the user. The user interface module 316 may also generate any other graphical data for providing any other user interfaces to a user or a reviewer.

Storage Device

Figure 4:
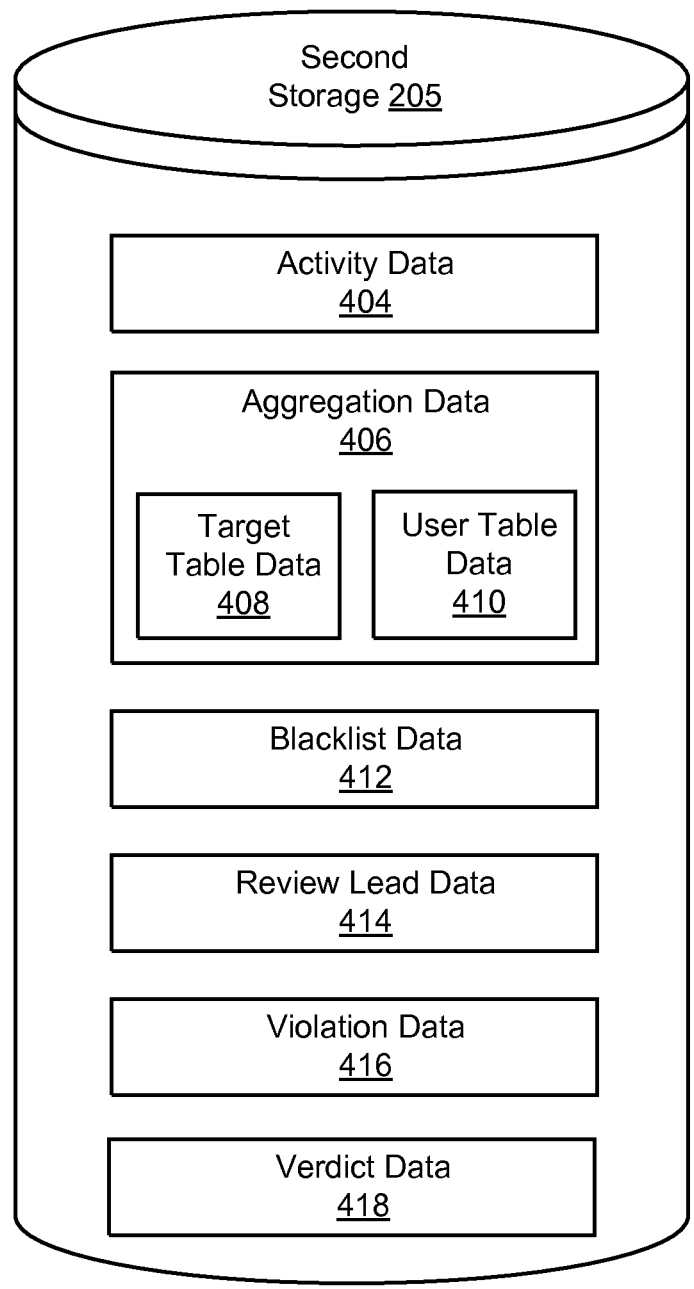
FIG. 4 is a block diagram illustrating a storage device according to some embodiments of the present disclosure.

Referring now to FIG. 4, the second storage 205 is described in more detail. FIG. 4 illustrates a block diagram of the second storage 205 according to some embodiments of the present disclosure. In the illustrated example, the second storage 205 includes activity data 404, aggregation data 406, blacklist data 412, review lead data 414, violation data 416 and verdict data 418.

The activity data 404 includes data describing any activities associated with endorsement events. For example, the activity data 404 includes one or more of an event timestamp indicating when an endorsement event was performed, a user ID identifying a user that has performed the endorsement event, a target ID identifying a target of the endorsement event, a spam signal indicating whether the endorsement event is a spam, a unique event ID identifying the endorsement event and an activity key for the endorsement event. In some embodiments, the activity data 404 includes data describing an activity table.

The aggregation data 406 includes any aggregation data generated by the aggregation module 308. In some embodiments, the aggregation data 406 includes target table data 408 and user table data 410. The target table data 408 is data describing a target table. For example, the target table data 408 includes data describing one or more of target keys, an activity column, a user column, an aggregation column and a verdict column of a target table. The user table data 410 is data describing a user table. For example, the user table data 410 includes data describing one or more of user keys, an activity column, a target column, an aggregation column and a verdict column of a user table.

The blacklist data 412 is data describing a blacklist. For example, the blacklist data 412 includes data describing one or more suspicious targets included in a blacklist.

The review lead data 414 is data describing one or more review leads. For example, the review lead data 414 includes data describing a review lead such as violation data describing an anomaly, address data describing one or more addresses (e.g., URLs) to retrieve one or more endorsement events associated with the anomaly and/or aggregation data associated with the anomaly from the user table or target table, etc.

The violation data 416 is any data associated with one or more anomalies. For example, the violation data 416 includes one or more of a type of violation (e.g., a type of anomaly), a time when the anomaly occurred, data explaining why the anomaly was triggered, a user ID identifying a suspicious user or a target ID identifying a suspicious target associated with the anomaly, event data describing one or more endorsement events associated with the anomaly, aggregation data associated with the anomaly, etc.

The verdict data 418 is data describing one or more review verdicts. For example, the verdict data 418 includes one or more of a lead ID identifying a review lead that a review verdict corresponds to, a target ID for a suspicious target or a user ID for a suspicious user, a reviewer ID identifying the reviewer and data describing a decision from the reviewer, etc.

Example Methods

Figure 5:
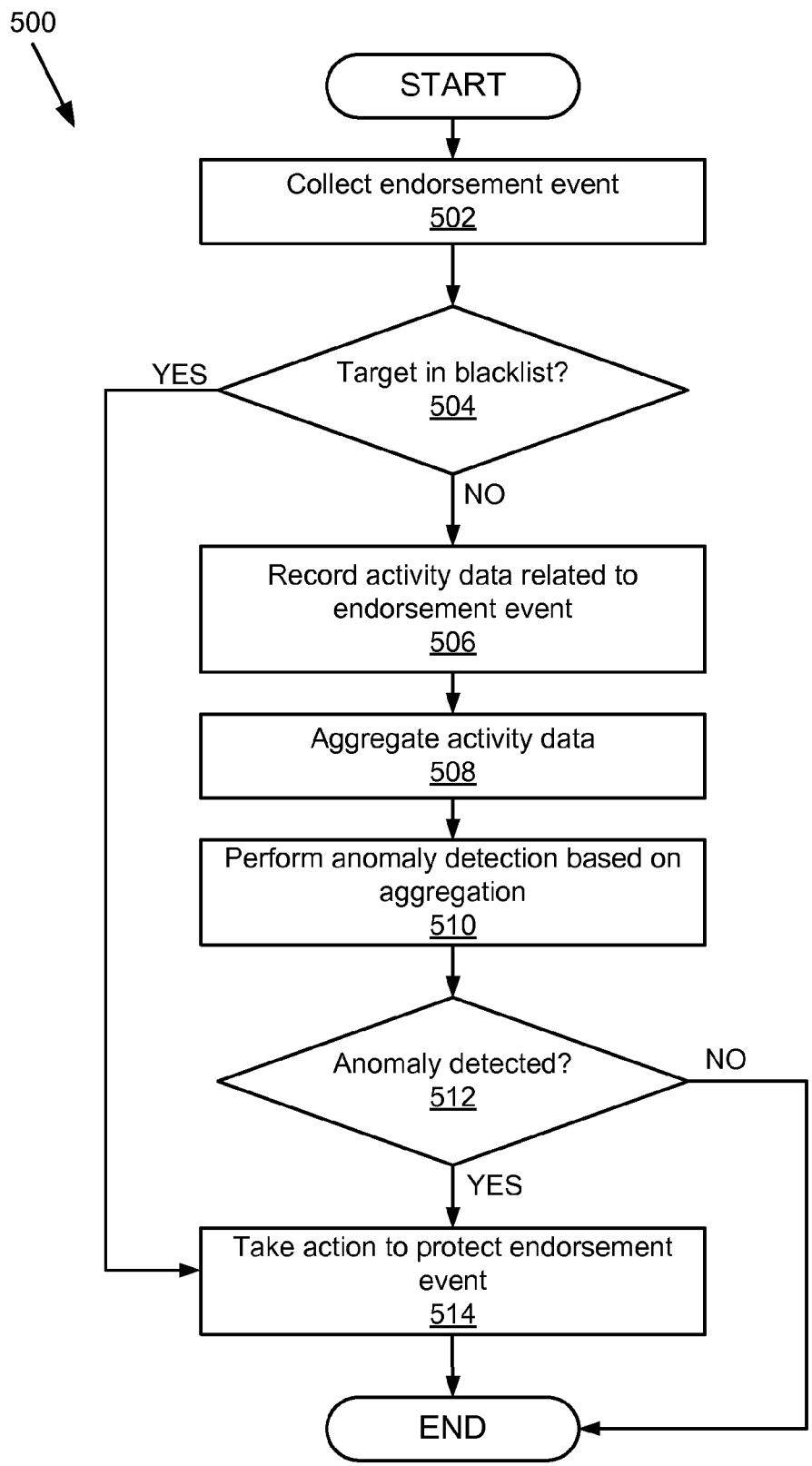
FIG. 5 is a flow chart illustrating a method for protecting endorsement events according to some embodiments of the present disclosure.

Referring now to FIG. 5, a method 500 for protecting endorsement events against anomalous behaviors according to some embodiments is described. The data collecting module 304 collects 502 event data describing one or more endorsement events. Some embodiments of block 502 are described in more detail below with reference to FIG. 6. In some embodiments, the data collecting module 304 determines 504 whether one or more targets associated with the one or more endorsement events are in a blacklist. The back-end adapter 113 may also determine 504 whether the one or more targets associated with the one or more endorsement events are in the blacklist. If the one or more targets are in the blacklist, the method 500 moves to block 514. Otherwise, the method 500 moves to block 506.

Turning to block 506, the activity recording module 306 records 506 activity data related to the one or more endorsement events. For example, the activity recording module 306 records the activity data in an activity table. The aggregation module 308 aggregates 508 the activity data. For example, the aggregation module 308 aggregates the activity data to generate one or more aggregation tables such as a user table and a target table. The aggregation module 308 populates the aggregation tables with the aggregation data. One example of block 508 is described in more detail below with reference to FIGS. 7A and 7B.

The detection module 310 performs 510 anomaly detection for the one or more endorsement events based at least in part on the aggregation of the activity data. For example, the detection module 310 performs anomaly detection based at least in part on the user table and/or the target table. One example of block 510 is described in more detail below with reference to FIG. 8. The detection module 310 determines 512 whether any anomaly is detected. If there is at least one anomaly detected, the method 500 moves to block 514. Otherwise, the method 500 ends.

Turning to block 514, the action module 312 takes one or more protection actions responsive to the detection of anomalies. For example, the action module 312 takes one or more protection actions such as: limiting a number of endorsement events that a suspicious user is allowed to perform; limiting a number of endorsement events allowed to be performed on a suspicious target; blocking a suspicious target from providing any endorsement service; ignoring endorsement events received from a suspicious target and/or a suspicious user; adding a suspicious target to a blacklist; and updating a decision history for a suspicious user or a suspicious target, etc. Block 514 is described further below with reference to FIG. 9.

Figure 6:
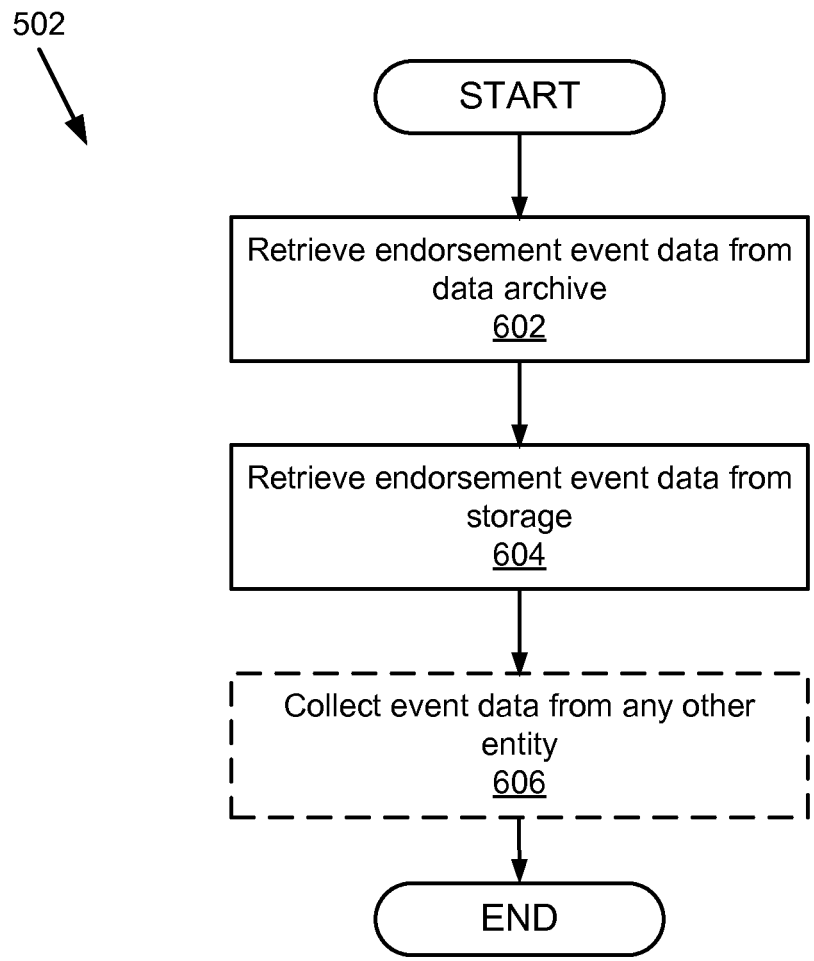
FIG. 6 is a flow chart illustrating a method for collecting event data according to some embodiments of the present disclosure.

Referring to FIG. 6, a method 502 for collecting event data according to some embodiments is described. The data collecting module 304 retrieves 602 event data from the data archive 207. The data collecting module 304 also retrieves 604 event data from the first storage 201. Optionally, the data collecting module 304 collects 606 event data from any other entities such as other systems 101, 107, 115, 121, 123, 129, 131, 135 and 139. For example, the data collecting module 304 collects event data from entities monitored by the endorsement server 127 in real time. As another example, the data collecting module 304 collects event data from other entities periodically.

Figure 7A:
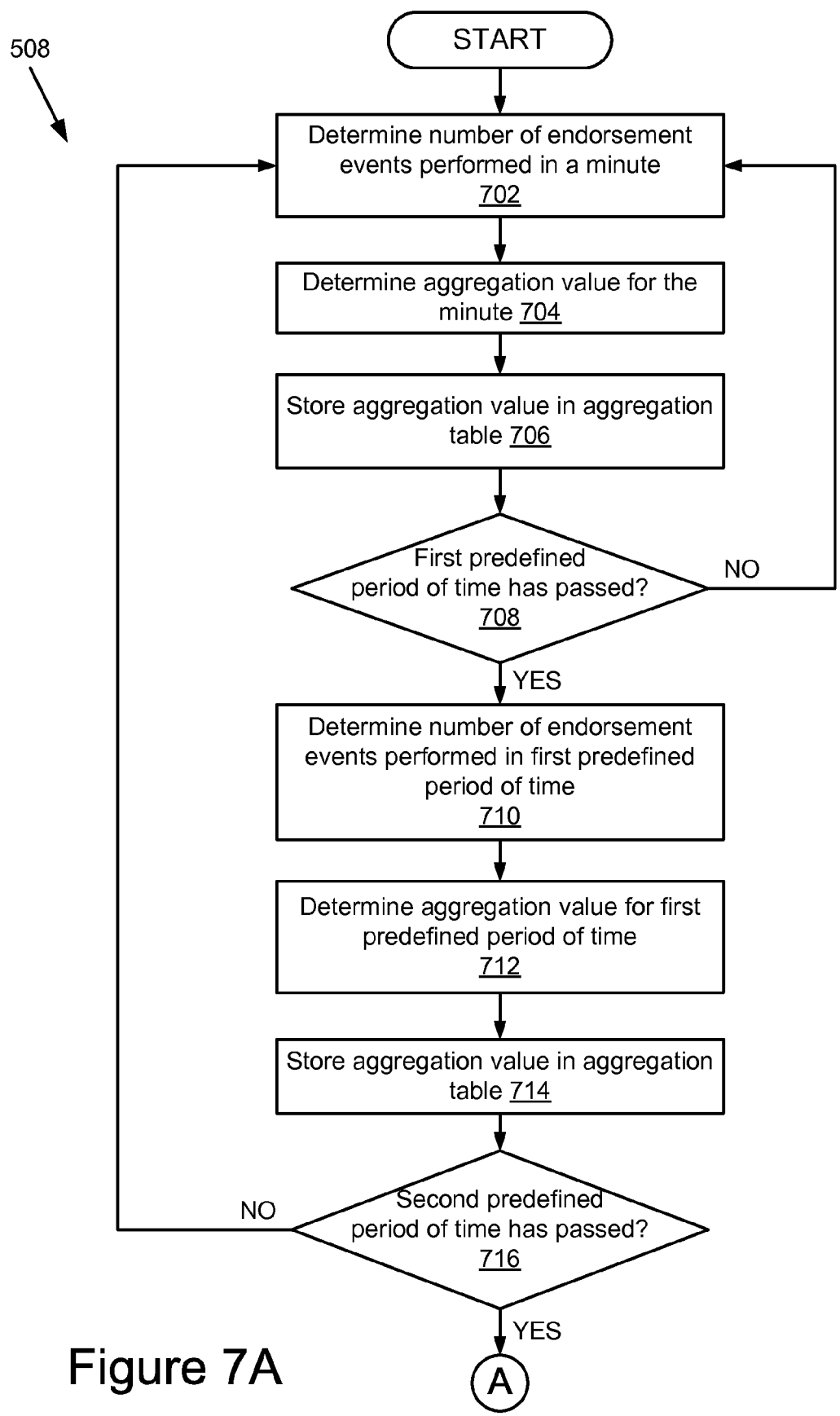
FIGS. 7A and 7B are flow charts illustrating a method for aggregating activity data according to some embodiments of the present disclosure.
Figure 7B:
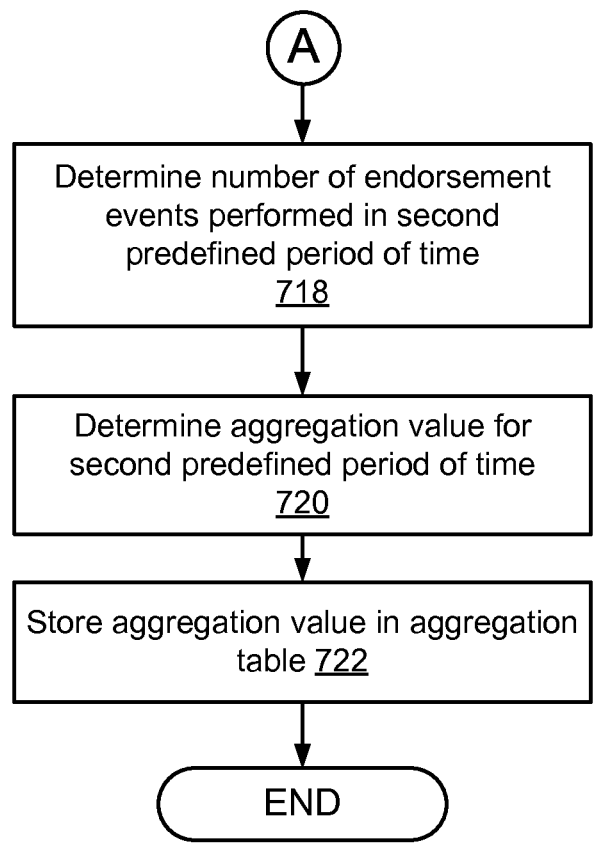

Referring now to FIGS. 7A and 7B, a method 508 for aggregating activity data according to some embodiments is described. In some embodiments, the aggregation module 308 performs operations included in the method 508 for aggregating the activity data for a user. For example, the aggregation module 308 performs the method 508 to determine aggregation values in multiple aggregation levels for a user. The aggregation module 308 stores the aggregation values in a user table for the user.

In some embodiments, the aggregation module 308 performs operations included in the method 508 for aggregating the activity data for a target. For example, the aggregation module 308 performs the method 508 to determine aggregation values in multiple aggregation levels for a target. The aggregation module 308 stores the aggregation values in a target table for the target. The aggregation module 308 may also perform operations included in the method 508 to generate any other aggregation values for any other element such as a location, a group of targets, a group of users, etc. For example, the aggregation module 308 performs the method 508 to determine the total number of endorsement events performed in the United States in a minute, an hour, a day or a week, etc.

Turning to FIG. 7A, the aggregation module 308 determines 702 the number of endorsement events performed in a minute from the activity data. For example, the aggregation module 308 determines the number of endorsement events performed by a user in a minute when aggregating the activity data for the user. As another example, the aggregation module 308 determines the number of endorsement events performed for a target in a minute when aggregating the activity data for the target. The aggregation module 308 determines 704 an aggregation value for the minute as the number of determined endorsement events. This aggregation value is in a minute aggregation level.

The aggregation module 308 stores 706 the aggregation value in an aggregation table. For example, the aggregation module 308 stores the aggregation value in the user table when aggregating the activity data for the user. As another example, the aggregation module 308 stores the aggregation value in the target table when aggregating the activity data for the target.

The aggregation module 308 determines 708 whether a first predefined period of time (e.g., an hour) has passed. If the first predefined period of time has not passed yet, the method 508 moves back to block 702. If the first predefined period of time has passed, the method 508 moves to block 710. At block 710, the aggregation module 308 determines the number of endorsement events performed in the first predefined period of time from the activity data. For example, the aggregation module 308 determines the number of endorsement events performed by a user in the predefined period of time (e.g., an hour) when aggregating the activity data for the user. As another example, the aggregation module 308 determines the number of endorsement events performed for a target in the predefined period of time when aggregating the activity data for the target.

In some embodiments, the aggregation module 308 determines the number of endorsement events performed in the first predefined period of time by summing up all the numbers of endorsement events performed in every minute during the first predefined period of time. For example, the aggregation module 308 determines the number of endorsement events performed in an hour by summing up all the numbers of endorsement events performed in every minute of the hour.

The aggregation module 308 determines 712 an aggregation value for the first predefined period of time (e.g., an hour). For example, the aggregation module 308 sets the number of endorsement events performed in the first predefined period of time as the aggregation value. This aggregation value is in a second aggregation level (e.g., an hour aggregation level).

The aggregation module 308 stores 714 the aggregation value in an aggregation table. For example, the aggregation module 308 stores the aggregation value in the user table when aggregating the activity data for the user. As another example, the aggregation module 308 stores the aggregation value in the target table when aggregating the activity data for the target. The aggregation module 308 determines 716 whether a second predefined period of time (e.g., a day) has passed. If the second predefined period of time has not passed yet, the method 508 moves back to block 702. If the second predefined period of time has passed, the method 508 moves to block 718.

Referring to FIG. 7B, the aggregation module 308 determines 718 the number of endorsement events performed in the second predefined period of time. For example, the aggregation module 308 determines the number of endorsement events performed by the user in the second predefined period of time (e.g., a day) when aggregating the activity data for the user. As another example, the aggregation module 308 determines the number of endorsement events performed for the target in the second predefine period of time when aggregating the activity data for the target.

In some embodiments, the aggregation module 308 determines the number of endorsement events performed in the second predefined period of time by summing up all the numbers of endorsement events performed in every first predefined period of time during the second predefined period of time. For example, the aggregation module 308 determines the number of endorsement events performed in a day by summing up all the numbers of endorsement events performed in every hour of the day.

The aggregation module 308 determines 720 an aggregation value for the second predefined period of time (e.g., a day). For example, the aggregation module 308 sets the number of endorsement events performed in the second predefined period of time as the aggregation value. This aggregation value is in a third aggregation level (e.g., a day aggregation level).

The aggregation module 308 stores 722 the aggregation value in an aggregation table. For example, the aggregation module 308 stores the aggregation value in the user table when aggregating the activity data for the user. As another example, the aggregation module 308 stores the aggregation value in the target table when aggregating the activity data for the target.

The method 508 is illustrated as an example for aggregating the activity data in three aggregation levels. In some embodiments, the method 508 may include any number of aggregation levels (e.g., a minute, hour, day, week, month and/or year aggregation level) and aggregate the activity data in any number of aggregation levels.

Referring now to FIG. 8, a method 510 for performing anomaly detection according to some embodiments is described. In some embodiments, the detection module 310 detects one or more anomalies associated with one or more endorsement events based at least in part on one or more aggregation tables. The method 510 is used as an example method for detecting any anomalies associated with a user based at least in part on a user table. The method 510 may also be applied to detecting any anomalies associated with a target based at least in part on a target table by performing operations similar to those described below with reference to FIG. 8.

The detection module 310 selects 802 an aggregation level to detect any anomaly in that aggregation level. The detection module 310 retrieves an aggregation value associated with the user in the aggregation level from the user table. If the method 510 is applied to detect anomalies associated with a target instead of detecting anomalies associated with a user, the detection module 310 retrieves an aggregation value associated with the target in the aggregation level from a target table. The detection module 310 determines 804 whether the aggregation violates a quota. For example, the detection module 310 determines whether the aggregation value exceeds a quota for the aggregation level. If the aggregation value exceeds the quota, the method 510 moves to block 806. Otherwise, the method moves to block 808. At block 806, the detection module 310 detects a quota anomaly and the method 510 ends.

Turning to block 808, the detection module 310 determines an aggregation speed based at least in part on the aggregation value and determines whether the aggregation speed exceeds a speed threshold. If the aggregation speed exceeds the speed threshold, the method 510 moves to block 810. Otherwise, the method 510 moves to block 812. At block 810, the detection module 310 detects a velocity anomaly. The method 510 ends.

Turning to block 812, the detection module 310 determines an aggregation entropy based at least in part on the aggregation value and determines whether the aggregation entropy is below an entropy threshold. If the aggregation entropy is below the entropy threshold, the method 510 moves to block 814. Otherwise, the method 510 moves to block 816. At block 814, the detection module 310 detects an entropy anomaly and the method 510 ends.

Turning to block 816, the detection module 310 determines whether there are any other aggregation levels to perform the detection. If there is at least one more aggregation level to perform the detection, the method 510 moves back to block 802. Otherwise, the method 510 moves to block 818. At block 818, the detection module 310 determines whether there is another anomaly associated with the user. If there is another anomaly associated with the user, the method 510 moves to block 820. Otherwise, the method 510 moves to block 822. At block 820, the detection module 310 detects, for example, a geo-location anomaly for the user and the method 510 ends. However, the detection module 310 detects 822 no anomaly associated with the endorsement events if none of the anomalies (e.g., quota anomaly, velocity anomaly, entropy anomaly, geo-location anomaly) is detected. The method 510 ends.

Figure 9:
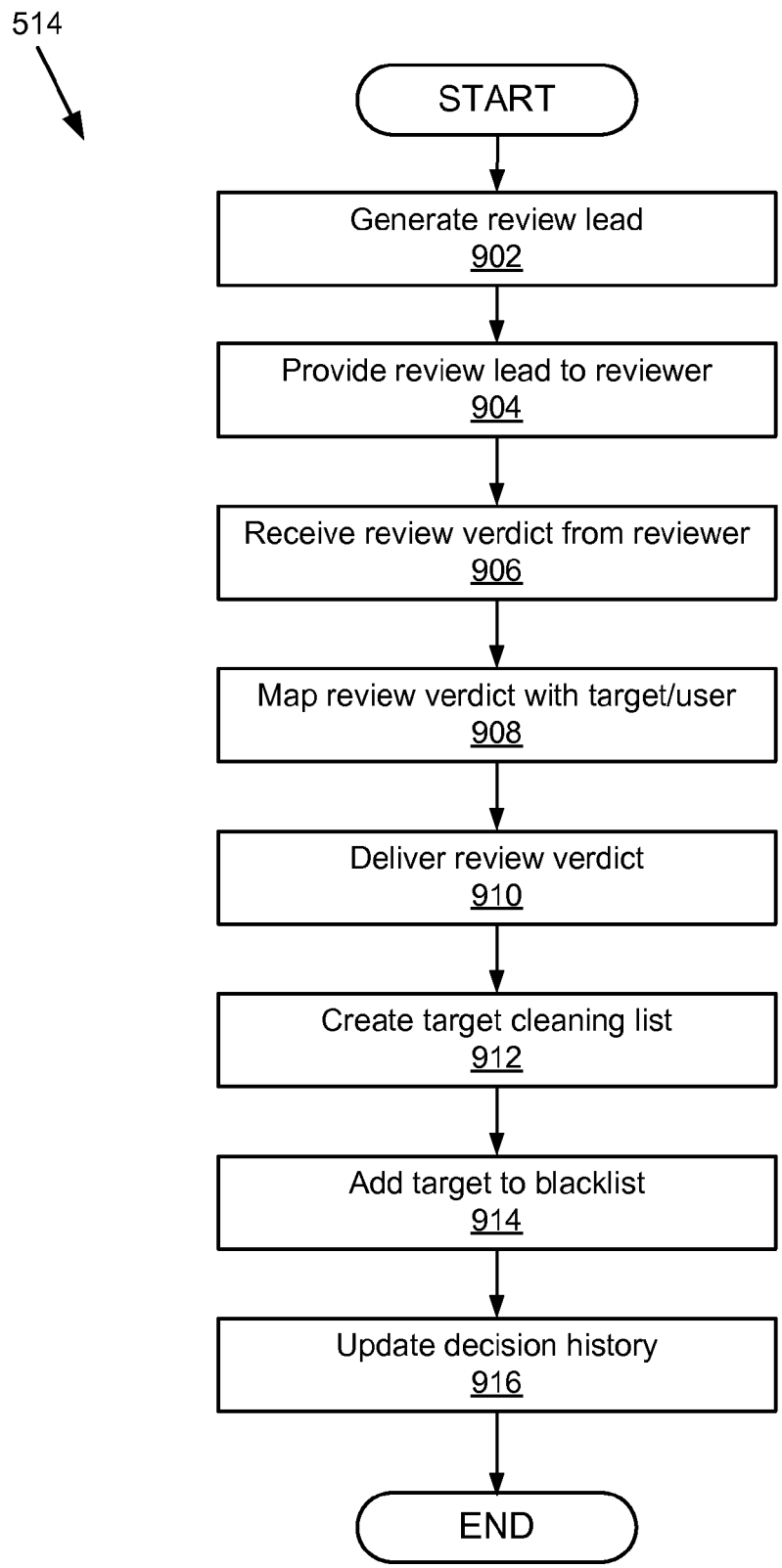
FIG. 9 is a flow chart illustrating a method for taking one or more protection actions responsive to detection of one or more anomalies according to some embodiments of the present disclosure.

Referring to FIG. 9, a method 514 for taking protection actions according to some embodiments is described. The review module 314 generates 902 a review lead for a reviewer to review an anomaly and provides 904 the review lead to the reviewer. For example, the review module 314 sends the review lead to the user interface module 316, causing the user interface module 316 to generate graphical data for providing a user interface and send the graphical data to a computing device operated by the reviewer. The user interface depicts the review lead. The reviewer provides a review verdict to the review lead via the user interface.

The action module 312 receives 906 the review verdict from the reviewer via the backend adapter 113. The action module 312 maps 908 the review verdict with a suspicious user and/or a suspicious target associated with the anomaly. The action module 312 delivers 910 the review verdict to any other systems such as the systems 101, 107, 115, 121, 123, 129, 131, 135 and 129.

In some embodiments, the action module 312 creates 912 a cleaning list of targets and add the suspicious target to the cleaning list. In some embodiments, the action module 312 adds 914 the suspicious target to a blacklist. The action module 312 updates 916 a decision history associated with the suspicious user and/or the suspicious target. For example, the action module 312 adds the review verdict to a section in a user table associated with the suspicious user. As another example, the action module 312 adds the review verdict to a section in a target table associated with the suspicious target.

Systems and methods for protecting endorsement events against anomalous behaviors have been described. While the present disclosure is described in the context of protecting endorsement events against anomalous behaviors, it should be understood that the terms "products" and "services" are used interchangeably throughout this specification and are used herein to encompass their plain and ordinary meaning including, but not limited to any online service, online product, online software that provides online endorsement services to users.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some embodiments above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In some embodiments, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies is in no way limited to implementation in any specific programming language, or for any specific operating system or environment. Accordingly, the disclosure of the present techniques and technologies is intended to be illustrative, but not limiting.

What is claimed is:

1. A method comprising:
    retrieving, using one or more computing devices, event data describing one or more endorsement events;
    determining, using the one or more computing devices, activity data associated with the one or more endorsement events;
    aggregating, using the one or more computing devices, the activity data to an aggregation level, wherein aggregating the activity data comprises: determining the aggregation level; generating an aggregation value for the aggregation level from the activity data, the aggregation value representing a number of endorsement events performed in the aggregation level; and storing the aggregation value in an aggregation table;
    detecting using the one or more computing devices, based at least in part on the aggregation level of the activity data, one or more anomalies, wherein the one or more anomalies represent suspicious behavior associated with the one or more endorsement events; and
    taking, using the one or more computing devices, one or more protection actions responsive to the detection of the one or more anomalies.

2. The method of claim 1, wherein aggregating the activity data comprises:
    aggregating the activity data to create one or more aggregation tables, wherein the one or more aggregation tables include one or more of a user table and a target table.

3. The method of claim 1, wherein detecting the one or more anomalies comprises:
    detecting the one or more anomalies based at least in part on one or more aggregation tables, wherein the one or more aggregation tables include one or more of a user table and a target table.

4. The method of claim 1, wherein detecting the one or more anomalies comprises:
    determining an aggregation level;
    retrieving an aggregation value associated with the aggregation level from an aggregation table; and
    detecting the one or more anomalies based at least in part on the aggregation value.

5. The method of claim 1, wherein taking the one or more protection actions comprises:
    generating one or more review leads for the one or more anomalies;
    providing the one or more review leads to a reviewer;
    receiving one or more review verdicts for the one or more review leads; and
    updating a decision history based at least in part on the one or more review verdicts.

6. The method of claim 1, wherein taking the one or more protection actions comprises:
    determining one or more suspicious targets associated with the one or more anomalies; and
    adding the one or more suspicious targets to a blacklist.

7. The method of claim 1, further comprising:
    identifying, using the one or more computing devices, one or more targets associated with the one or more endorsement events;
    determining, using the one or more computing devices, whether the one or more targets are in a blacklist; and
    responsive to the determination that the one or more targets are in the blacklist, blocking the one or more endorsement events using the one or more computing devices.

8. A computer program product comprising a non-transitory computer usable medium including a computer readable program, wherein the computer readable program when executed on a computer causes the computer to:
    retrieve event data describing one or more endorsement events; determine activity data associated with the one or more endorsement events;
    aggregate the activity data to an aggregation level, wherein aggregating the activity data comprises: determining the aggregation level; generating an aggregation value for the aggregation level from the activity data, the aggregation value representing a number of endorsement events performed in the aggregation level; and storing the aggregation value in an aggregation table;

detect, based at least in part on the aggregation level of the activity data, one or more anomalies, wherein the one or more anomalies represent suspicious behavior associated with the one or more endorsement events; and take one or more protection actions responsive to the detection of the one or more anomalies.

9. The computer program product of claim 8, wherein aggregating the activity data comprises:

aggregating the activity data to create one or more aggregation tables, wherein the one or more aggregation tables include one or more of a user table and a target table.

10. The computer program product of claim 8, wherein detecting the one or more anomalies comprises:

detecting the one or more anomalies based at least in part on one or more aggregation tables, wherein the one or more aggregation tables include one or more of a user table and a target table.

11. The computer program product of claim 8, wherein detecting the one or more anomalies comprises:

determining an aggregation level;

retrieving an aggregation value associated with the aggregation level from an aggregation table; and detecting the one or more anomalies based at least in part on the aggregation value.

12. The computer program product of claim 8, wherein taking the one or more protection actions comprises:

generating one or more review leads for the one or more anomalies;

providing the one or more review leads to a reviewer;

receiving one or more review verdicts for the one or more review leads; and updating a decision history based at least in part on the one or more review verdicts.

13. The computer program product of claim 8, wherein taking the one or more protection actions comprises:

determining one or more suspicious targets associated with the one or more anomalies; and adding the one or more suspicious targets to a blacklist.

14. The computer program product of claim 8, wherein the computer readable program when executed on the computer also causes the computer to:

identify one or more targets associated with the one or more endorsement events;

determine whether the one or more targets are in a blacklist; and responsive to the determination that the one or more targets are in the blacklist, block the one or more endorsement events.

15. A system comprising:

one or more processors, the one or more processors being configured to:

retrieve event data describing one or more endorsement events;

determine activity data associated with the one or more endorsement events;

aggregate the activity data to an aggregation level, wherein the one or more processors aggregate the activity data by: determining the aggregation level; generating an aggregation value for the aggregation level from the activity data, the aggregation value representing a number of endorsement events performed in the aggregation level; and storing the aggregation value in an aggregation table;

detect, based at least in part on the aggregation level of the activity data, one or more anomalies, wherein the one or more anomalies represent suspicious behavior associated with the one or more endorsement events; and take one or more protection actions responsive to the detection of the one or more anomalies.

16. The system of claim 15, wherein the one or more processors aggregate the activity data by:

aggregating the activity data to create one or more aggregation tables, wherein the one or more aggregation tables include one or more of a user table and a target table.

17. The system of claim 15, wherein the one or more processors detect the one or more anomalies associated with the one or more endorsement events by:

detecting the one or more anomalies based at least in part on one or more aggregation tables, wherein the one or more aggregation tables include one or more of a user table and a target table.

18. The system of claim 15, wherein the one or more processors detect the one or more anomalies associated with the one or more endorsement events by:

determining an aggregation level;

retrieving an aggregation value associated with the aggregation level from an aggregation table; and detecting the one or more anomalies based at least in part on the aggregation value.

19. The system of claim 15, wherein the one or more processors take the one or more protection actions by:

generating one or more review leads for the one or more anomalies;

providing the one or more review leads to a reviewer;

receiving one or more review verdicts for the one or more review leads; and updating a decision history based at least in part on the one or more review verdicts.

20. The system of claim 15, wherein the one or more processors take the one or more protection actions by:

determining one or more suspicious targets associated with the one or more anomalies; and adding the one or more suspicious targets to a blacklist.

21. The system of claim 15, wherein the one or more processors are further configured to:

identify one or more targets associated with the one or more endorsement events;

determine whether the one or more targets are in a blacklist; and responsive to the determination that the one or more targets are in the blacklist, block the one or more endorsement events.

* * * * *